United States Patent
Rihn et al.

(10) Patent No.: US 10,247,283 B2
(45) Date of Patent: Apr. 2, 2019

(54) AUTOMATIC TRANSMISSION FOR HYBRID VEHICLE AND CONTROL METHOD

(71) Applicant: PUNCH POWERGLIDE STRASBOURG (SOCIETE PAR ACTIONS SIMPLIFIEE), Strasbourg (FR)

(72) Inventors: Matthieu Rihn, Kuttolsheim (FR); Cyrille Bridier, Strasbourg (FR)

(73) Assignee: PUNCH POWERGLIDE STRASBOURG (SOCIETE PAR ACTIONS SIMPLIFIEE), Strasbourg (FR)

( * ) Notice: Subject to any disclaimer, the term of this patent is extended or adjusted under 35 U.S.C. 154(b) by 140 days.

(21) Appl. No.: 15/314,243

(22) PCT Filed: May 22, 2015

(86) PCT No.: PCT/FR2015/051367
§ 371 (c)(1),
(2) Date: Nov. 28, 2016

(87) PCT Pub. No.: WO2015/181480
PCT Pub. Date: Dec. 3, 2015

(65) Prior Publication Data
US 2017/0184182 A1    Jun. 29, 2017

(30) Foreign Application Priority Data
May 27, 2014   (FR) ...................................... 14 54773

(51) Int. Cl.
*F16H 3/72*    (2006.01)
*B60K 6/365*   (2007.10)
(Continued)

(52) U.S. Cl.
CPC ............. *F16H 3/725* (2013.01); *B60K 6/365* (2013.01); *B60K 6/48* (2013.01); *F16H 3/663* (2013.01);
(Continued)

(58) Field of Classification Search
CPC .... F16H 3/735; F16H 3/663; F16H 2003/445; B60K 6/365; B60K 6/48
See application file for complete search history.

(56) References Cited

U.S. PATENT DOCUMENTS

| | | |
|---|---|---|
| 2007/0243966 A1 | 10/2007 | Holmes et al. |
| 2008/0011529 A1 | 1/2008 | Hoher et al. |

(Continued)

FOREIGN PATENT DOCUMENTS

| | | |
|---|---|---|
| DE | 10 2010 031 026 A1 | 1/2012 |
| EP | 1 386 771 A2 | 2/2004 |

(Continued)

OTHER PUBLICATIONS

International Search Report, dated Sep. 8, 2015, from corresponding PCT Application, PCT/FR2015/051367 (2 pages).

*Primary Examiner* — Mark J Beauchaine
(74) *Attorney, Agent, or Firm* — Young & Thompson

(57) ABSTRACT

An automatic transmission for a hybrid vehicle, includes: an input shaft (AE) driven by the heat engine; an output wheel, ring gear or pinion (RCPS); a stationary element (ES), such as a casing; an electric motor (ME) in which the stator (ST) is rigidly connected to the stationary element (ES); and at least first, second and third members for selective torque transmission (C13; C234; C12-E2), which can be engaged or activated selectively in order to establish different transmission ratios. The automatic transmission also includes a single Ravigneaux double planetary gear set (TPR) in which the functional elements that make up same are arranged in (Continued)

two stages of planetary gear sets (ET1 and ET2) connected by the aforementioned members to the input shaft (AE), to the rotor (RO) of the electric motor (ME) and to the stationary element (ES).

20 Claims, 5 Drawing Sheets

(51) Int. Cl.
*B60K 6/48* (2007.10)
*F16H 3/66* (2006.01)
*F16H 3/44* (2006.01)

(52) U.S. Cl.
CPC ... *B60K 2006/4816* (2013.01); *B60Y 2200/92* (2013.01); *F16H 2003/445* (2013.01); *F16H 2200/2005* (2013.01); *F16H 2200/2025* (2013.01); *F16H 2200/2038* (2013.01); *F16H 2200/2041* (2013.01); *Y10S 903/91* (2013.01); *Y10S 903/918* (2013.01)

(56) References Cited

U.S. PATENT DOCUMENTS

| | | | |
|---|---|---|---|
| 2008/0176704 A1* | 7/2008 | Raghavan | F16H 3/728 475/275 |
| 2010/0250075 A1* | 9/2010 | Suzuki | B60W 10/06 701/55 |
| 2012/0174708 A1 | 7/2012 | Nagamori et al. | |
| 2015/0120115 A1* | 4/2015 | Chinbe | B60W 10/06 701/22 |

FOREIGN PATENT DOCUMENTS

| | | |
|---|---|---|
| EP | 1 503 485 A1 | 2/2005 |
| WO | 2008/141876 A1 | 11/2008 |
| WO | 2013/034538 A1 | 3/2013 |

* cited by examiner

| Mode | Rapport de couple | C13 | C23 | C12-E2 |
|---|---|---|---|---|
| E1 | 0,701 | | | X |
| EVT1 | 4,492 | X | | |
| EVT2 | 2,408 | | X | |
| T1 | 2,032 | X | | X |
| T2 | 1,421 | | X | X |
| T3 | 1,000 | X | X | |

Fig 3

| Mode | Rapport de couple | C13 | C234 | C12-E2 | C4-E1 |
|---|---|---|---|---|---|
| E1 | 1,421 | | | | X |
| E2 | 0,592 | | | X | |
| EVT1 | 3,375 | X | | | |
| EVT2 | 1,71 | | X | | |
| T1 | 1,969 | X | | X | |
| T2 | 1,290 | | X | X | |
| T3 | 1 | X | X | | |
| T4 | 0,701 | | X | | X |

Fig 4

| Mode | Rapport de couple | C13 | C234 | C12-E2 | C4-E1 |
|---|---|---|---|---|---|
| E1 | 1,421 | | | | X |
| E2 | 0,592 | | | X | |
| EVT1 | 3,375 | | | | |
| EVT2 | 1,71 | | X | | |
| T1 | 1,969 | X | | X | |
| T2 | 1,290 | | X | X | |
| T3 | 1 | X | X | | |
| T4 | 0,701 | | X | | X |

Fig 5

| Mode | Rapport de couple | C13 | C234 | C12-E2 | C4-E1 |
|---|---|---|---|---|---|
| E1 | 1,421 | | | | X |
| E2 | 0,592 | | | X | |
| EVT1 | 3,378 | X | | | |
| EVT2 | 1,71 | | X | | |
| T1 | 1,969 | X | | X | |
| T2 | 1,290 | | X | X | |
| T3 | 1 | X | X | | |
| T4 | 0,701 | | X | | X |

Fig 6

| Mode | Rapport de couple | C13 | C234 | C12-E2 | C4-E1 |
|---|---|---|---|---|---|
| E1 | 1,421 | | | | X |
| E2 | 0,592 | | | X | |
| EVT1 | 3,378 | X | | | |
| EVT2 | 1,71 | | X | | |
| T1 | 1,969 | X | | X | |
| T2 | 1,290 | | X | X | |
| T3 | 1 | X | X | | |
| T4 | 0,701 | | X | | X |

Fig 7

AUTOMATIC TRANSMISSION FOR HYBRID VEHICLE AND CONTROL METHOD

BACKGROUND OF THE INVENTION

The present invention concerns the field of equipment for motor vehicles, more particularly that of thermal-electric hybrid vehicles (comprising a heat engine, usually an internal combustion engine, and at least one electric motor) and relates to an automatic transmission, or automatic gearbox, optimized for such vehicles.

The invention relates more specifically to transmissions for hybrid vehicles that can operate purely by electric drive, in other words for vehicles that can be moved solely by the action of an electric motor and in which the heat-engine and electric-motor drives pass through the same transmission before being applied to the driving wheels.

For the above-mentioned type of vehicle, the state of the art currently offers two main types of architecture.

A first type of architecture corresponds to so-called Type "P2" parallel hybrids, which operate with an electric motor placed between the heat engine and the gearbox. A special decoupling clutch is provided that allows the heat engine to be disconnected from the drive chain.

In the event of decoupling, operation is of the purely electric type, the electric motor supplying the torque to the gearbox, instead of the heat engine. The electric motor can also serve as a transmission brake in normal braking situations: it is then in generator mode and produces electricity to recharge the battery. The gearbox then operates in a conventional manner, adapting the gear ratios to the optimal operating speed of the electric motor. In the absence of decoupling, when the heat engine is connected, the electric motor can be enlisted as a motor or generator, to provide a power boost for acceleration or to recharge the battery.

This first architecture is currently the most widely used, at least in the European market.

It has the advantage of being able to use an existing gearbox to the input of which an electric motor is connected together with a decoupling clutch enabling the heat engine to be disconnected from the traction drive. This means that it is not necessary to develop a special hybrid transmission system. Moreover, when the battery is flat and the vehicle can no longer be propelled except by means of the heat engine, a large number of gear ratios are always available, allowing the heat engine to operate at its optimum speed.

However, this first known solution has its drawbacks: for high electric motor powers (more than 40 kW, chiefly for plug-in vehicles, in other words rechargeable from an external source), it becomes difficult to integrate this motor in the gearbox, thus resulting in an increase in the overall size of the drivetrain. The space constraints for placing the motor between the engine and the gearbox means that expensive motors with permanent magnets must be used.

Moreover, it has been determined that the more the power of the electrical system increases in relation to that of the heat engine, the less the need for gear ratios to achieve the same vehicle performance.

Lastly, if the battery is flat and there is no more energy available to start the electric motor, a special starting system must be provided on the heat engine (such as a hydraulic torque converter or a friction clutch). In other words, the resulting system occupies too much space, is too expensive and too complex for the performance provided.

Examples of transmission constructions suitable for this first type of architecture are in particular disclosed in documents US 2008/011529 and WO 2008/141876.

A second type of architecture is known by the name of in-series or series/parallel hybrid.

In this second solution, a generator driven by the heat engine produces electricity that is used to run an electric motor that propels the vehicle (series operation). In most of the current arrangements, some of the power of the heat engine is however transmitted mechanically to the wheels (series/parallel operation).

Such a system is perfectly optimized for hybrid operation, with any number of gear ratios enabling the electric motors and the engine to run at optimum speeds with a minimum of gears and clutches (because there is no need to create multiple mechanical gear ratios). Moreover, there is no need for a special starting system on the heat engine, since starting can always be achieved in series mode.

By contrast, one major drawback lies in the extra weight and cost caused by using two electric motors, while only one is really used for the propulsion of the vehicle. Thus, in the case of series operation, if a 60 kW electric motor is used to propel the vehicle, a 60 kW generator must also be provided. In conclusion, twice the desired propulsion power must be embarked (see for example EP 1 386 771 and US 2012/174708).

In an attempt to counter these drawbacks and overcome the limitations of existing solutions, transmissions and gearboxes specially adapted to hybrid vehicles have in the meantime been developed and offered on the market, which include an electric motor as standard.

This new generation of transmissions usually has the following characteristics:

two to five gears than can be used to propel the vehicle by means of the heat engine;

one or two gears to propel the vehicle by means of the electric motor;

a method of vehicle takeoff or start-up by the heat engine, using the electric motor in generator mode like a variable speed drive (variable ratio operation mode, see for example DE 102010031026A1).

The number of ratios associated with the electric motor in these new transmissions is adjusted to suit the needs of a hybrid vehicle (no superfluous equipment to achieve six or eight speeds). The possible provision of two electric speeds allows the operation of the electric motor to be adjusted within its ranges of speed and torque where it is the most effective, thus enabling the use of asynchronous motors that are less expensive than permanent-magnet motors, but with a smaller optimum efficiency zone. The variable ratio start-up method economizes on a vehicle takeoff device on the engine (converter or clutch with a high energy-dissipation capacity), while still offering a possibility of takeoff other than electric, particularly when the batteries have reached their minimal charge threshold (for example after repeated start-ups in congested traffic).

Nevertheless, these new developments in transmission specifically designed for hybrid vehicles also involve complex constructions, in particular requiring at least three planetary gear sets and at least four selective torque transmission devices (clutches or coupling mechanisms).

Moreover, these new developments do not allow a simple transition, in terms of construction, from a basic version, with more limited possibilities, to a more sophisticated version, with increased possibilities in terms of number of available gear ratios.

SUMMARY OF THE INVENTION

The aim of the present invention is to propose an improved solution compared to the existing one, in particular by offering a less complex construction, and to overcome at least the main above-mentioned drawbacks.

To this end, the subject-matter of the invention relates to an automatic transmission for a thermal-electric hybrid vehicle comprising:
an input shaft driven by the heat engine;
an output gear, ring gear or pinion;
a stationary element, such as a casing for example;
an electric motor in which the stator is connected to the stationary element;
at least the first, second and third selective torque transmission devices capable of being engaged or activated selectively in order to establish, on the one hand, at least one gear ratio for driving the engine under the action of the electric motor operating as a motor, on the other hand, two gear ratios for driving the vehicle under the action of the heat engine; automatic transmission characterised in that it also includes one Ravigneaux double planetary gear set, comprising the following constituent operating elements: the first and second sun gears, the first and second ring gears and the first and second set of planet gears mounted on a common planet-carrier, these elements being arranged in two stages of planetary gear sets connected together by one or more long gears engaging with each of the said stages, it being possible for the first stage to be connected selectively to the input shaft by means of the first and second torque transmission devices and the second stage being, on the one hand, permanently connected to the rotor of the electric motor and, on the other, selectively connected to the stationary element by means of the third torque transmission device.

BRIEF DESCRIPTION OF THE DRAWINGS

A better understanding of the invention will emerge from the following description, which relates to preferred embodiments, given by way of non-limiting examples and explained with reference to the accompanying schematic drawings, in which:

FIG. 3 shows, with respect to the variations represented in FIGS. 1A and 1B, a change of basis matrix or interlocking frame of the different selective torque transmission devices forming part of the transmission according to the invention, indicating the gear numbers and drive mode, as well as the staging (gear ratios);

FIG. 4 shows, with respect to the variations represented in FIGS. 2A and 2B, a change of basis matrix or interlocking frame of the different selective torque transmission devices forming part of the transmission according to the invention, indicating the gear numbers and the drive mode, as well as the staging (gear ratios)

FIGS. 5 to 7 show, on the basis of the change of basis matrix shown in FIG. 4, different strategies of gear changes from different situations on starting, and;

DETAILED DESCRIPTION OF THE PREFERRED EMBODIMENTS

FIGS. 1 and 2 show an automatic transmission for a thermal-electric hybrid vehicle comprising:
an input shaft (AE) driven by the heat engine;
an output gear, ring gear or pinion (RCPS); a stationary element (ES), such as a casing;
an electric motor (ME) in which the stator (ST) is connected to the stationary element (ES);
at least the first, second and third selective torque transmission devices C13; C23 or C234; C12-E2, which can be engaged or activated selectively in order to establish, on the one hand, at least one gear ratio for driving a vehicle under the action of the electric motor (ME) operating as motor, on the other hand, two gear ratios for driving the vehicle under the action of the heat engine in the continuously variable speed mode (the electric motor (ME) then acting in generator mode and performing a rotating reaction) and, lastly, at least three gear ratios for driving the vehicle under the action of the heat engine (not shown).

According to the invention, this transmission also includes one Ravigneaux double planetary gear set (TPR), comprising the following constituent operating elements: the first and second sun gears S1 and S2, the first and second ring gears R1 and R2 and the first and second set of planet gears PS1 and PS2 mounted on a common planet-carrier SC, these elements being arranged in two stages of planetary gear sets ET1 and ET2 connected together by one or more long gears PL engaging with each of the said stages ET1 and ET2, it being possible for the first stage ET1 to be connected selectively to the input shaft AE by means of the first and second torque transmission devices C13 and C23 or C234 and the second stage ET2 being, on the one hand, permanently connected to the rotor RO or the electric motor ME and, on the other, selectively connected to the stationary element ES by means of the third torque transmission device C12-E2.

It will be noted that both FIGS. 1 and 2 show half of a cross-sectional view of the transmission along a plane containing the longitudinal axis of the transmission (virtual axis with which the input shaft AE and the output means RCPS are aligned).

Figure 1A:
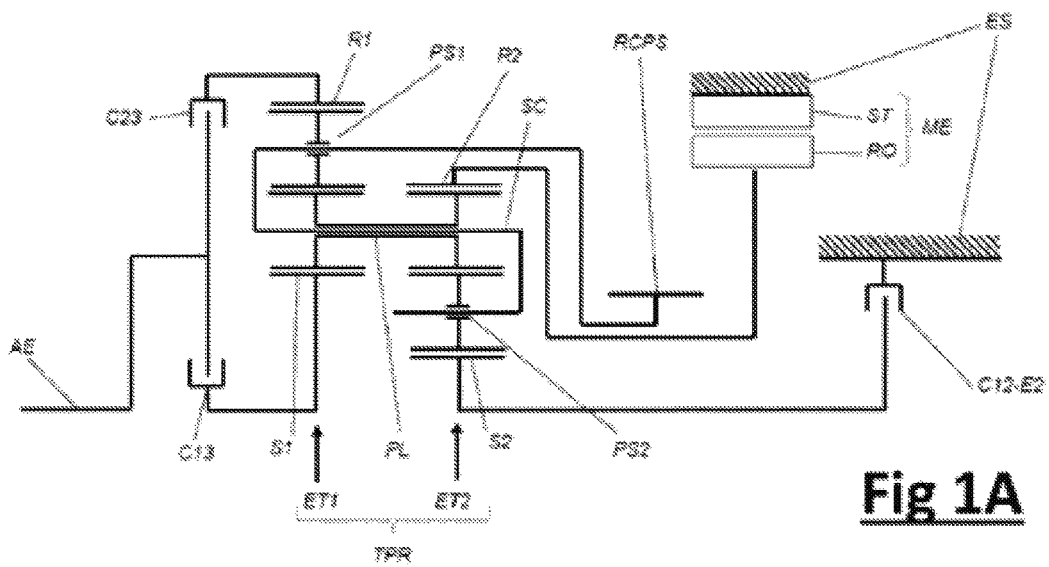
FIGS. 1A and 1B are symbolic line diagram of two variations of a first embodiment of an automatic transmission according to the invention.
Figure 1B:
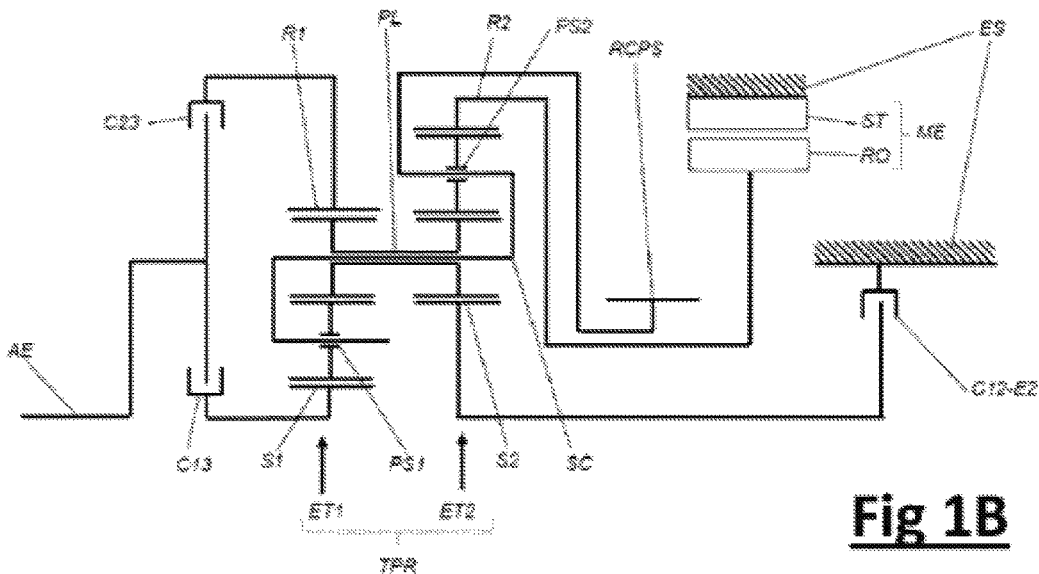

In its basic version shown in FIGS. 1A and 1B, the automatic transmission comprises one double planetary gear set TPR and only three selective torque transmission devices C13; C23 or C234; C12-E2.

With this configuration, by the appropriate activation of said devices, this transmission allows the following to be obtained:
three gear ratios associated with the heat engine,
one gear ratio associated with the electric motor ME,
two continuously variable ratio modes.

Thus, with a structure that is simple (four devices), compact (two stages, integration of electric motor) and inexpensive, the invention provides a proposal of transmission ratios suitable for implementation with a hybrid propulsion system.

The two possibilities of injecting motion into the Ravigneaux double gear set (selectively by devices C13 and C23 or C234) provide two continuously variable distinct ratios EVT1 and EVT2.

As FIGS. 1 and 2 also show, to each long gear PL are advantageously connected, on one side, a planet gear PS1 in the first stage ET1, which engages with the said long gear PL and with the ring gear R1 or the sun gear S1 of said stage ET1 and, on the other, a planet gear PS2 in the second stage ET2, which engages with the said long gear PL and with the ring gear R2 of the sun gear S2 of said stage ET2, the planet-carrier SC carrying the said long gear PL and carrying the two planet gears PS1 and PS2 with the option of free rotation.

Although only one long gear PL is shown in FIGS. 1 and 2, preferably several (for example two or three distributed about the longitudinal axis) are provided with their two planet gears PS1 and connected.

In terms of the input and output of motion, the first and second torque transmission devices C13 and C23 or C234 may selectively connect the input shaft AE to the sun gear S1 and the ring gear R1 respectively of the first stage ET1 of the Ravigneaux double planetary gear set TPR, the output sun gear, ring gear or pinion RCPS being connected directly to the planet-carrier SC.

Preferably, the rotor RO of the electric motor ME is connected directly or linked by an arrangement of gears to the ring gear R2 of the second stage ET2 of the Ravigneaux double planetary gear set TPR, said arrangement of gears possibly being planetary or parallel.

It will be noted that the two variations of FIGS. 1A and 1B differ in that the double planetary gear set TPR is inverted.

The two stages ET1 and ET2 of the double planetary gear set comprise the different means of engagement (ring gears, gears, pinions) distributed in two parallel planes, perpendicular to the longitudinal axis and spaced along it.

Figure 2A:
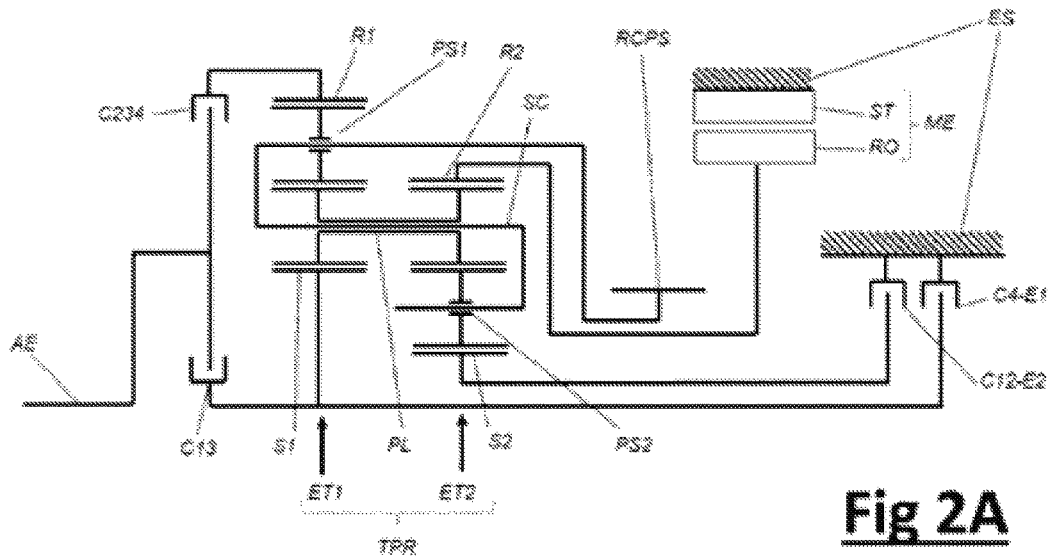
FIGS. 2A and 2B are symbolic line diagrams of two variations of a second embodiment of an automatic transmission according to the invention, being more sophisticated versions of the embodiments of transmissions shown in FIGS. 1A and 1B respectively.
Figure 2B:
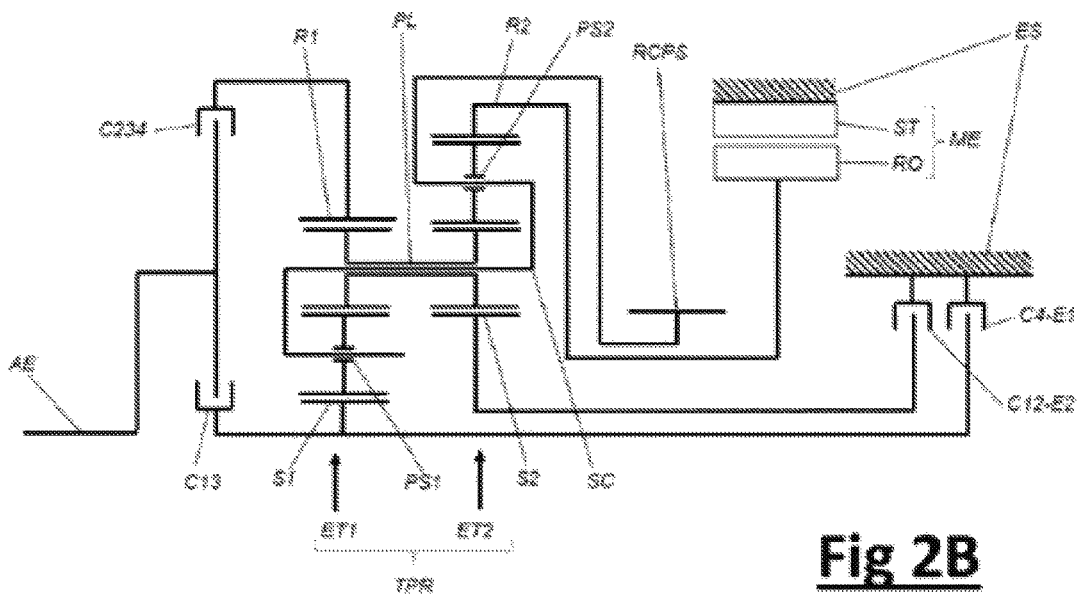

According to a second preferred embodiment of the invention, and as emerges from FIGS. 2A, 2B and 4, the automatic transmission may comprise a fourth selective torque transmission device C4-E1 capable of connecting the sun gear S1 of the first stage ET1 to the stationary element ES, thus enabling the establishment of at least one additional gear ratio for driving the vehicle under the action of the electric motor ME operating as a motor, on the one hand, and at least one additional gear ratio for driving the vehicle under the action of the heat engine, on the other.

FIGS. 2A and 2B show two practical variations of this second embodiment, which differ due to the inversion of the double planetary gear set TPR.

Thanks to this second preferred embodiment of the invention, by the selective activation of the four clutch devices, the following can be obtained:
four gear ratios associated with the heat engine,
two gear ratios associated with the electric motor ME,
two continuously variable ratio modes.

In the two gear ratios for driving the vehicle under the action of the heat engine in continuously variable mode, the electric motor ME can operate in generating mode and thus recharge the vehicle's battery.

As shown in FIGS. 3 and 4 with respect to FIGS. 1 and 2, it may be arranged that, in order to establish each of the gear ratios for drive by the electric motor ME and each of the ratios for drive by the heat engine in continuously variable mode, only one of the selective torque transmission devices C13; C23 or C234; C12-E2; C4-E1 is activated or engaged and that, in order to establish each of the gear ratios for drive by the heat engine, two of the selective torque transmission devices C13; C23 or C234; C12-E2; C4-E1 are activated or engaged.

Moreover, it also emerges from the above-mentioned Figures that the gear ratios for driving the vehicle under the action of the heat engine consist exclusively in forward gear ratios, the shift from one given gear to an immediately higher or immediately lower gear being advantageously performed, on the one hand, by disengaging or deactivating one device of the pair of devices achieving the current gear and, on the other, by engaging or activating one device forming part of the pair of devices destined to achieve the new gear.

Thus the electric gear or gears E1, E2 is (are) used to start the vehicle from stationary when sufficient power remains in the battery. Moreover, E1, and possibly E2, are used to achieve movements in reverse gear.

Ratios EVT1 and EVT2 correspond to fixed torque ratios (indicated in the tables in FIGS. 3 and 4) associated with continuously variable gear ratios. EVT1 is used to start the vehicle when the amount of energy stored in the battery is insufficient to start using the electric motor (ME).

When any one of ratios T1 to T4 is engaged (fixed ratios for drive by the heat engine), the electric motor ME, that runs at a fixed gear ratio in relation to the other transmission elements, can be used indiscriminately as a motor or generator, either to give the vehicle a power boost or to recover the energy that will be sent to the battery.

Clearly, the values of the ratios in the tables in FIGS. 3 to 7 are given purely by way of example and can be modified by changing the number of gear teeth.

In practical use of the automatic transmission shown in FIGS. 1A and 1B, with respect to the matrix in FIG. 3, the following selective torque transmission devices or pairs of devices are respectively engaged or activated in order to establish a fixed or continuously variable speed transmission ratio:
the third device C12-E2 for the speed in electric-motor ME drive,
the first device C13 for the first ratio in continuously variable mode,
the second device C23 or C234 for the second ratio in continuously variable mode,
the first and third devices C13 and C12-E2 for the first speed in heat-engine drive,
the second and third devices C23 or C234 and C12-E2 for the second speed in heat-engine drive,
the first and second devices C13 and C23 or C234 for the third gear in heat-engine drive.

In practical use of the automatic transmission shown in FIGS. 2A and 2B, with respect to the matrix in FIG. 4, the following selective torque transmission devices or pairs of devices are respectively engaged or activated in order to establish a transmission ratio at a fixed or continuously variable speed transmission ratio:
the fourth device C4-E1 for the first speed in electric-motor ME drive,
the third device C12-E2 for the second speed in electric-motor ME drive,
the first device C13 for the first ratio in continuously variable mode,
the second device C23 or C234 for the second ratio in continuously variable mode,
the first and third devices C13 and C12-E2 for the first speed in heat-engine drive,
the second and third devices C23 or C234 and C12-E2 for the second speed in heat-engine drive,
the first and second devices C13 and C23 or C234 for the third gear in heat-engine drive,
the second and fourth devices C23 or C234 and C4-E1 for the fourth speed in heat-engine drive.

Figure 8:
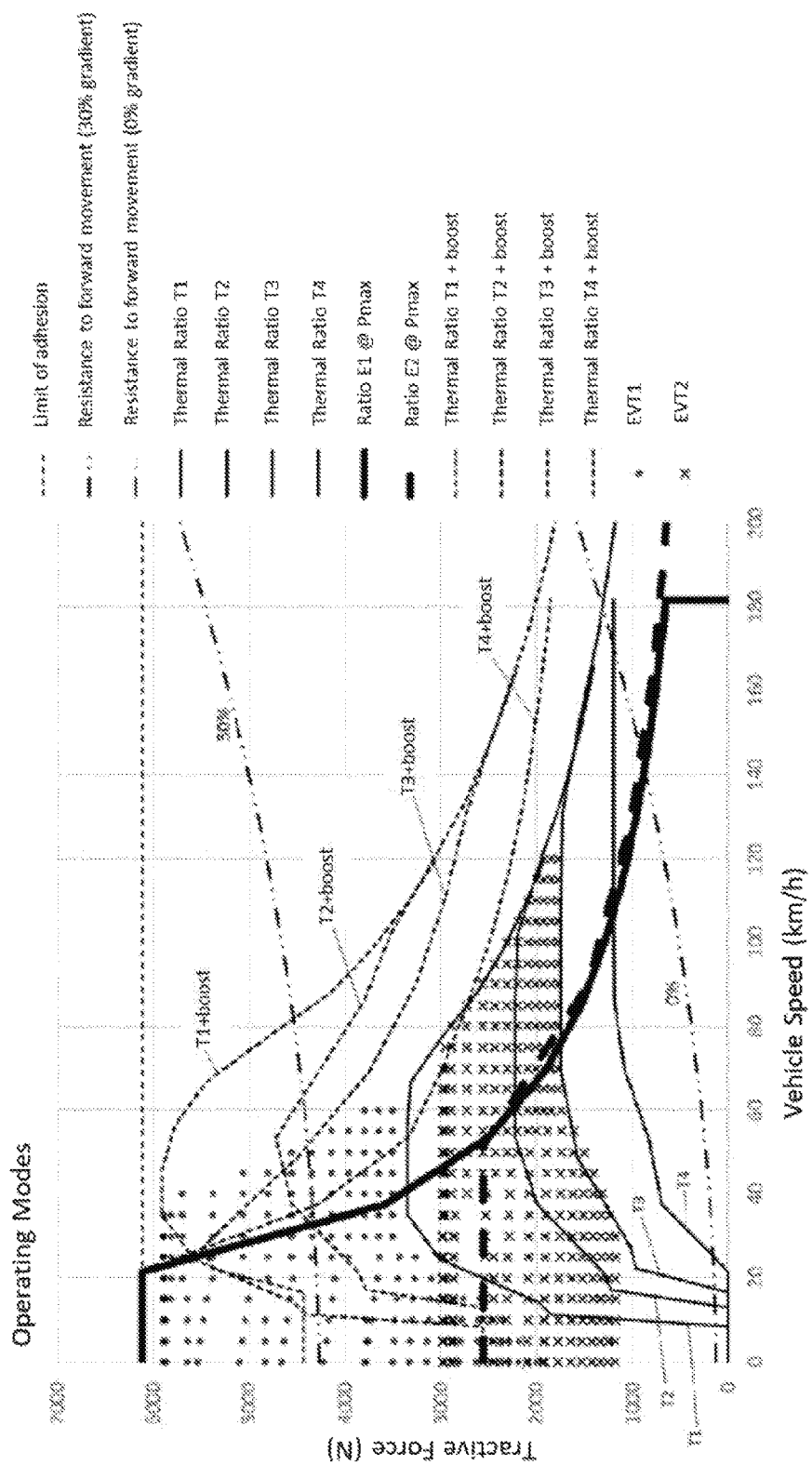
FIG. 8 shows graphs representing the tractive force of Newtons in relations to the speed of the vehicle in kilometers/hour for various gears/ratios.

The performance and ranges of use of the different operating modes of the transmission according to the invention (embodiment corresponding to FIGS. 2A and 3) are shown in FIG. 8, by way of example, in the form of graphs representing the tractive force in Newtons based on the vehicle's speed in kilometers/hour.

It will be noted that the four gear ratios available for heat-engine drive only ("Thermal ratio Ti" curves) are doubled by four additional gear ratios corresponding to heat-engine assisted by the electric motor ME operating in motor mode ("Thermal ratio Ti+Boost" curves).

The point "." and "x" clusters show possible operating points in the two continuously variable ratios EVT1 and EVT2, the electric motor being used as a generator.

Determination of the optimal operating ranges in the different drive modes lies within the normal practical know-how of a person skilled in the art.

This invention also concerns a method of controlling an automatic transmission system as previously described and fitted in a hybrid vehicle provided with a rechargeable battery.

This method consists, on starting, in checking the level of charge of the battery and comparing it to a low threshold value, then either starting the vehicle by means of the electric motor ME if the level of charge is greater than or equal to the threshold value, by engaging the corresponding gear ratios or ratio, or in starting the vehicle by means of the heat engine if the level of charge is below the threshold value, by engaging one of the transmission ratios at a continuously variable speed ratio.

Lastly, FIGS. 5 to 7 show different strategies of shifting gear, from stationary up to maximum cruising speed, depending chiefly on the charge of the hybrid vehicle's battery.

As shown in FIG. 5, the following successive operations can be envisaged with a battery with a level of charge above its maximum charge:
the vehicle starts in E1 (operating with the electric motor),
shifts to E2 (operating on the electric motor),
shifts to T1 (operating on the heat engine),
shifts to T2 (operating on the heat engine),
shifts to T3 (operating on the heat engine),
shifts to T4 (operating on the heat engine).

The series of operations shown in FIG. 6 can be performed when the battery has a level of charge below its minimum value:
the vehicle starts in EVT1 (operating in continuously variable mode),
shifts to T1 (operating on the heat engine),
shifts to T2 (operating on the heat engine),
shifts to T3 (operating on the heat engine),
shifts to T4 (operating on the heat engine).

FIG. 7 shows a variation in the starting strategy compared to FIG. 6 comprising the following stages:
the vehicle starts in EVT1 (operating in continuously variable mode),
shifts to EVT2 (operating in continuously variable mode),
shifts to T2 (operating on the heat engine),
shifts to T3 (operating on the heat engine),
shifts to T4 (operating on the heat engine), Clearly, the invention is not limited to the embodiments described and shown in the accompanying drawings. Modifications can be made, particularly from the point of view of the make up of the various elements or by substituting equivalent techniques, without departing from the scope of protection of the invention.

The invention claimed is:

1. An automatic transmission for a thermal-electric hybrid vehicle, comprising:
an input shaft (AE) driven by the heat engine;
an output gear, ring gear or pinion (RCPS);
a stationary element (ES);
an electric motor (ME) in which a stator (ST) is connected to the stationary element (ES);
at least first, second and third selective torque transmission devices (C13; C23 or C234; C12-E2) capable of being engaged or activated selectively in order to establish, on the one hand, at least one gear ratio for driving the engine under the action of the electric motor (ME) operating as a motor, on the other hand, two gear ratios for driving the vehicle under the action of the heat engine in continuously variable speed mode and, lastly, at least three gear ratios for driving the vehicle under the action of the heat engine; and
one Ravigneaux double planetary gear set, including the following constituent operating elements: the first and second sun gears (S1 and S2), the first and second ring gears (R1 and R2) and the first and second set of planet gears (PS1 and PS2) mounted on a common planet-carrier (SC), these elements being arranged in two stages of planetary gear sets (ET1 and ET2) connected together by one or more long gears (PL) engaging with each of the said stages (ET1 and ET2), it being possible for the first stage (ET1) to be connected selectively to the input shaft (AE) by means of the first and second torque transmission devices (C13 and C23 or C234) and the second stage (ET2) being, on the one hand, permanently connected to the rotor (RO) of the electric motor (ME) and, on the other, selectively connected to the stationary element (ES) by means of the third torque transmission device (C12-E2).

2. The automatic transmission according to claim 1, wherein to each long gear (PL) are advantageously connected, on one side, a planet gear (PS1) in the first stage (ET1), which engages with the said long gear (PL) and with the ring gear (R1) or the sun gear (S1) of said stage (ET1) and, on the other, a planet gear (PS2) in the second stage (ET2), which engages with the said long gear (PL) and with the ring gear (R2) of the sun gear (S2) of said stage (ET2), the planet-carrier (SC) carrying the said long gear (PL) and carrying the two planet gears (PS1 and PS2) with the option of free rotation.

3. The automatic transmission according to claim 2, wherein the first and second torque transmission devices (C13 and C23 or C234) selectively connect the input shaft (AE) to the sun gear (S1) and the ring gear (R1) respectively of the first stage (ET1) of the Ravigneaux double planetary gear set (TPR), the output sun gear, ring gear or pinion (RCPS) being connected directly to the planet-carrier (SC).

4. The automatic transmission according to claim 2, wherein the rotor (RO) of the electric motor (ME) is connected directly or linked by an arrangement of gears to the ring gear (R2) of the second stage (ET2) of the Ravigneaux double planetary gear set (TPR).

5. The automatic transmission according to claim 2, further comprising:
a fourth selective torque transmission device (C4-E1) capable of connecting the sun gear (S1) of the first stage (ET1) to the stationary element (ES), thus enabling the establishment of at least one additional gear ratio for driving the vehicle under the action of the electric motor (ME) operating as a motor, on the one hand, and at least one additional gear ratio for driving the vehicle under the action of the heat engine, on the other.

6. The automatic transmission according to claim 2, wherein in the two gear ratios for driving the vehicle under the action of the heat engine in the continuously variable speed mode, the electric motor (ME) operates in generator mode and recharges the vehicle's battery.

7. The automatic transmission according to claim 2, wherein in order to establish each of the gear ratios for drive by the electric motor (ME) and each of the ratios for drive by the heat engine in continuously variable mode, only one of the selective torque transmission devices (C13; C23 or C234; C12-E2; C4-E1) is activated or engaged and that, in order to establish each of the gear ratios for drive by the heat engine, two of the selective torque transmission devices (C13; C23 or C234; C12-E2; C4-E1) are activated or engaged.

8. The automatic transmission according to claim 2, wherein the gear ratios for driving the vehicle under the action of the heat engine consist exclusively in forward gear ratios, the shift from one given gear to an immediately higher or immediately lower gear being advantageously performed, on the one hand, by disengaging or deactivating one device of the pair of devices achieving the current gear and, on the other, by engaging or activating one device forming part of the pair of devices destined to achieve the new gear.

9. The automatic transmission according to claim 2, wherein the following selective torque transmission devices or pairs of devices are respectively engaged or activated in order to establish a fixed or continuously variable speed transmission ratio:
the third device (C12-E2) for the speed in electric-motor (ME) drive,
the first device (C13) for the first ratio in continuously variable mode,
the second device (C23 or C234) for the second ratio in continuously variable mode,
the first and third devices (C13 and C12-E2) for the first speed in heat-engine drive,
the second and third devices (C23 or C234 and C12-E2) for the second speed in heat-engine drive,
the first and second devices (C13 and C23 or C234) for the third gear in heat-engine drive.

10. The automatic transmission according to claim 1, wherein the first and second torque transmission devices (C13 and C23 or C234) selectively connect the input shaft (AE) to the sun gear (S1) and the ring gear (R1) respectively of the first stage (ET1) of the Ravigneaux double planetary gear set (TPR), the output sun gear, ring gear or pinion (RCPS) being connected directly to the planet-carrier (SC).

11. The automatic transmission according to claim 1, wherein the rotor (RO) of the electric motor (ME) is connected directly or linked by an arrangement of gears to the ring gear (R2) of the second stage (ET2) of the Ravigneaux double planetary gear set (TPR).

12. The automatic transmission according to claim 1, further comprising:
a fourth selective torque transmission device (C4-E1) capable of connecting the sun gear (S1) of the first stage (ET1) to the stationary element (ES), thus enabling the establishment of at least one additional gear ratio for driving the vehicle under the action of the electric motor (ME) operating as a motor, on the one hand, and at least one additional gear ratio for driving the vehicle under the action of the heat engine, on the other.

13. The automatic transmission according to claim 12, wherein the following selective torque transmission devices or pairs of devices are respectively engaged or activated in order to establish a transmission ratio at a fixed or continuously variable speed transmission ratio:
the fourth device (C4-E1) for the first speed in electric-motor (ME) drive,
the third device (C12-E2) for the second speed in electric-motor (ME) drive,
the first device (C13) for the first ratio in continuously variable mode,
the second device (C23 or C234) for the second ratio in continuously variable mode,
the first and third devices (C13 and C12-E2) for the first speed in heat-engine drive,
the second and third devices (C23 or C234 and C12-E2) for the second speed in heat-engine drive,
the first and second devices (C13 and C23 or C234) for the third gear in heat-engine drive,
the second and fourth devices (C23 or C234 and C4-E1) for the fourth speed in heat-engine drive.

14. The automatic transmission according to claim 1, wherein in the two gear ratios for driving the vehicle under the action of the heat engine in the continuously variable speed mode, the electric motor (ME) operates in generator mode and recharges the vehicle's battery.

15. The automatic transmission according to claim 14, wherein the following selective torque transmission devices or pairs of devices are respectively engaged or activated in order to establish a fixed or continuously variable speed transmission ratio:
the third device (C12-E2) for the speed in electric-motor (ME) drive,
the first device (C13) for the first ratio in continuously variable mode,
the second device (C23 or C234) for the second ratio in continuously variable mode,
the first and third devices (C13 and C12-E2) for the first speed in heat-engine drive,
the second and third devices (C23 or C234 and C12-E2) for the second speed in heat-engine drive,
the first and second devices (C13 and C23 or C234) for the third gear in heat-engine drive.

16. The automatic transmission according to claim 14, wherein the following selective torque transmission devices or pairs of devices are respectively engaged or activated in order to establish a transmission ratio at a fixed or continuously variable speed transmission ratio:
the fourth device (C4-E1) for the first speed in electric-motor (ME) drive,
the third device (C12-E2) for the second speed in electric-motor (ME) drive,
the first device (C13) for the first ratio in continuously variable mode,
the second device (C23 or C234) for the second ratio in continuously variable mode,
the first and third devices (C13 and C12-E2) for the first speed in heat-engine drive,
the second and third devices (C23 or C234 and C12-E2) for the second speed in heat-engine drive,
the first and second devices (C13 and C23 or C234) for the third gear in heat-engine drive,
the second and fourth devices (C23 or C234 and C4-E1) for the fourth speed in heat-engine drive.

17. The automatic transmission according to claim 1, wherein in order to establish each of the gear ratios for drive by the electric motor (ME) and each of the ratios for drive by the heat engine in continuously variable mode, only one of the selective torque transmission devices (C13; C23 or C234; C12-E2; C4-E1) is activated or engaged and that, in order to establish each of the gear ratios for drive by the heat engine, two of the selective torque transmission devices (C13; C23 or C234; C12-E2; C4-E1) are activated or engaged.

18. The automatic transmission according to claim 1, wherein the gear ratios for driving the vehicle under the action of the heat engine consist exclusively in forward gear ratios, the shift from one given gear to an immediately higher or immediately lower gear being advantageously performed, on the one hand, by disengaging or deactivating one device of the pair of devices achieving the current gear and, on the other, by engaging or activating one device forming part of the pair of devices destined to achieve the new gear.

19. The automatic transmission according to claim 1, wherein the following selective torque transmission devices or pairs of devices are respectively engaged or activated in order to establish a fixed or continuously variable speed transmission ratio:

the third device (C12-E2) for the speed in electric-motor (ME) drive, the first device (C13) for the first ratio in continuously variable mode, the second device (C23 or C234) for the second ratio in continuously variable mode, the first and third devices (C13 and C12-E2) for the first speed in heat-engine drive, the second and third devices (C23 or C234 and C12-E2) for the second speed in heat-engine drive, the first and second devices (C13 and C23 or C234) for the third gear in heat-engine drive.

20. A method of controlling an automatic transmission system according to claim 1 fitted in a hybrid vehicle provided with a rechargeable battery, which comprises starting, checking the level of charge of the battery, and comparing the level of charge to a low threshold value, then either starting the vehicle by means of the electric motor (ME) if the level of charge is greater than or equal to the threshold value, by engaging the corresponding gear ratios or ratio, or starting the vehicle by means of the heat engine if the level of charge is below the threshold value, by engaging one of the transmission ratios at a continuously variable speed ratio.

* * * * *